United States Patent
McNaughton et al.

[11] 3,883,786
[45] May 13, 1975

[54] PULSE WIDTH MODULATED SERVO SYSTEM

[75] Inventors: Lawrence S. McNaughton, Stuarts Draft; John M. Rhoades; Irvin L. Erler, both of Waynesboro, all of Va.; Kenneth M. Watkins, Fairview, Pa.

[73] Assignee: General Electric Company, Salem, Va.

[22] Filed: Oct. 12, 1973

[21] Appl. No.: 405,936

[52] U.S. Cl. ............... 318/317; 318/327; 318/341
[51] Int. Cl. ........................................ H02h 7/08
[58] Field of Search ........... 318/317, 341, 318, 327

[56] References Cited
UNITED STATES PATENTS

| | | | |
|---|---|---|---|
| 3,551,747 | 12/1970 | Joslyn | 318/599 UX |
| 3,560,829 | 2/1971 | Brennan | 318/599 |
| 3,783,360 | 1/1974 | Bundy | 318/327 |
| 3,806,787 | 4/1974 | Erler | 318/599 |

*Primary Examiner*—B. Dobeck
*Attorney, Agent, or Firm*—W. C. Bernkopf; J. H. Beusse

[57] ABSTRACT

A motor control circuit includes four power switches connected to form a bridge. A d-c motor is connected across one diagonal of the bridge and a d-c voltage source is connected across the other diagonal of the bridge. The analog portion of the motor control circuit generates a pulse width command signal that controls the conducting intervals of the pairs of diagonally opposed switches so as to drive the motor in proportion to a commanded velocity signal. The analog control portion of the motor control circuit includes a first summing amplifier that generates an armature voltage command signal that is a function of the difference between the commanded velocity signal and the actual velocity of the motor. A second summing amplifier generates the pulse width command signal which is a function of the difference between the armature voltage command signal and a signal representative of the actual armature voltage of the motor. Circuitry is provided for modifying the pulse width command signal so as to reduce the motor armature current when the motor armature current exceeds a maximum value. Circuitry is also provided for maintaining all four power switches in the open condition if the current in any leg of the bridge becomes excessive or if the terminal voltage of the d-c voltage source is not within certain prescribed limits. There is further provided circuitry for switching an additional load across the motor during certain regenerative conditions wherein excessive energy is being returned to the d-c voltage source.

20 Claims, 16 Drawing Figures

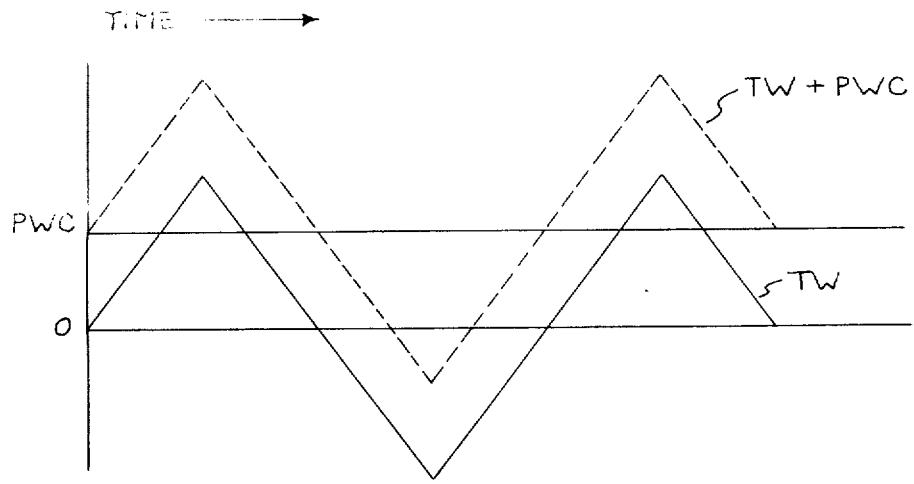
FIG. 3ª
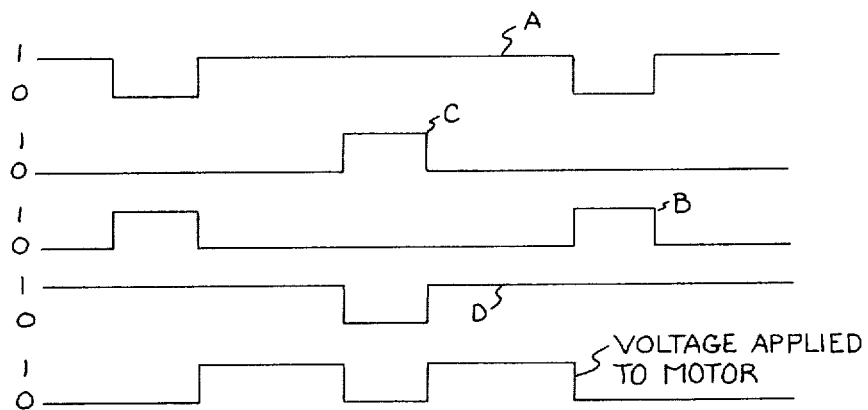
FIG. 3ᵇ
FIG. 3ᶜ
FIG. 3ᵈ
FIG. 3ᵉ
FIG. 3ᶠ
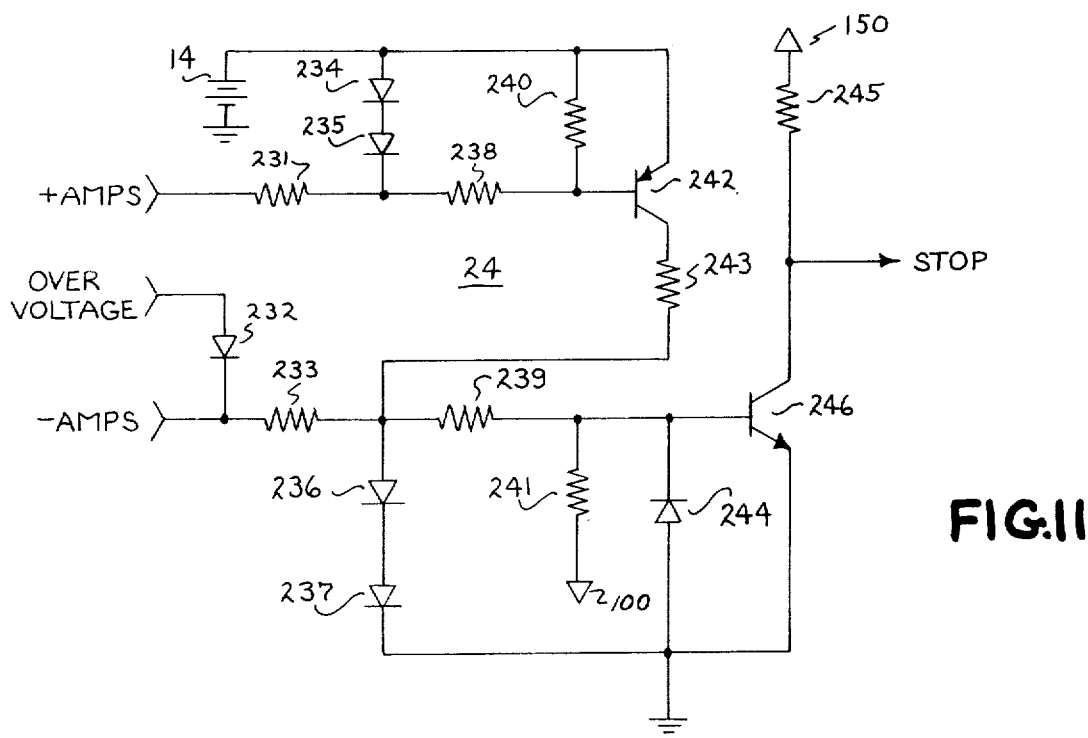
FIG. 11

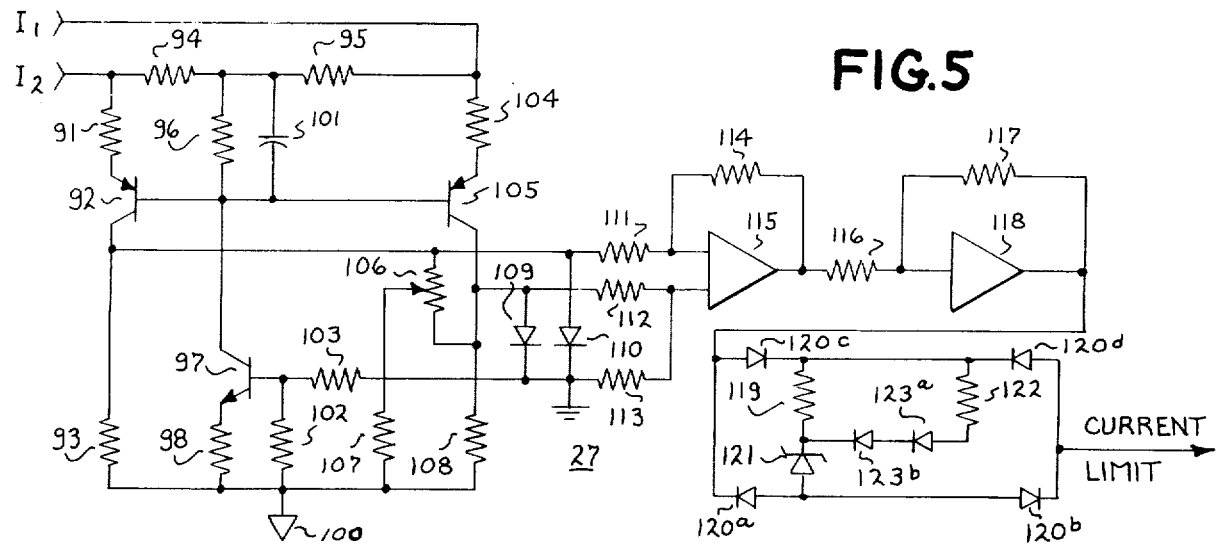
FIG. 5
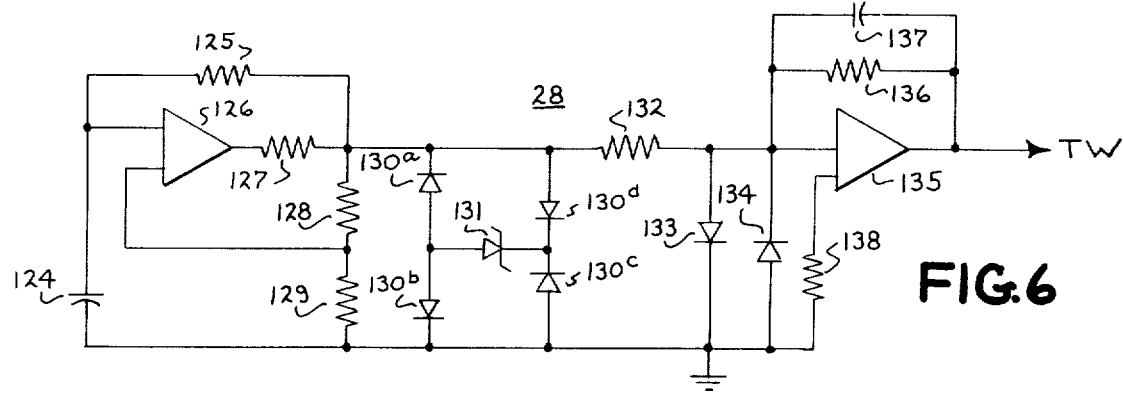
FIG. 6
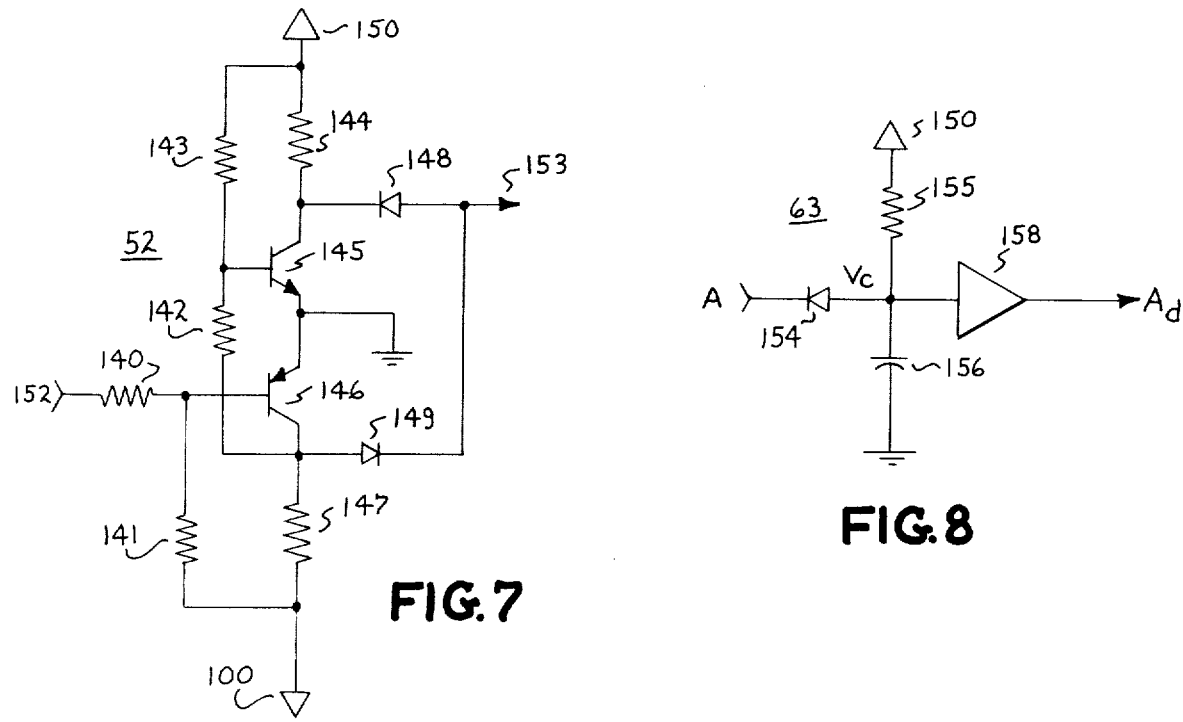
FIG. 7
FIG. 8

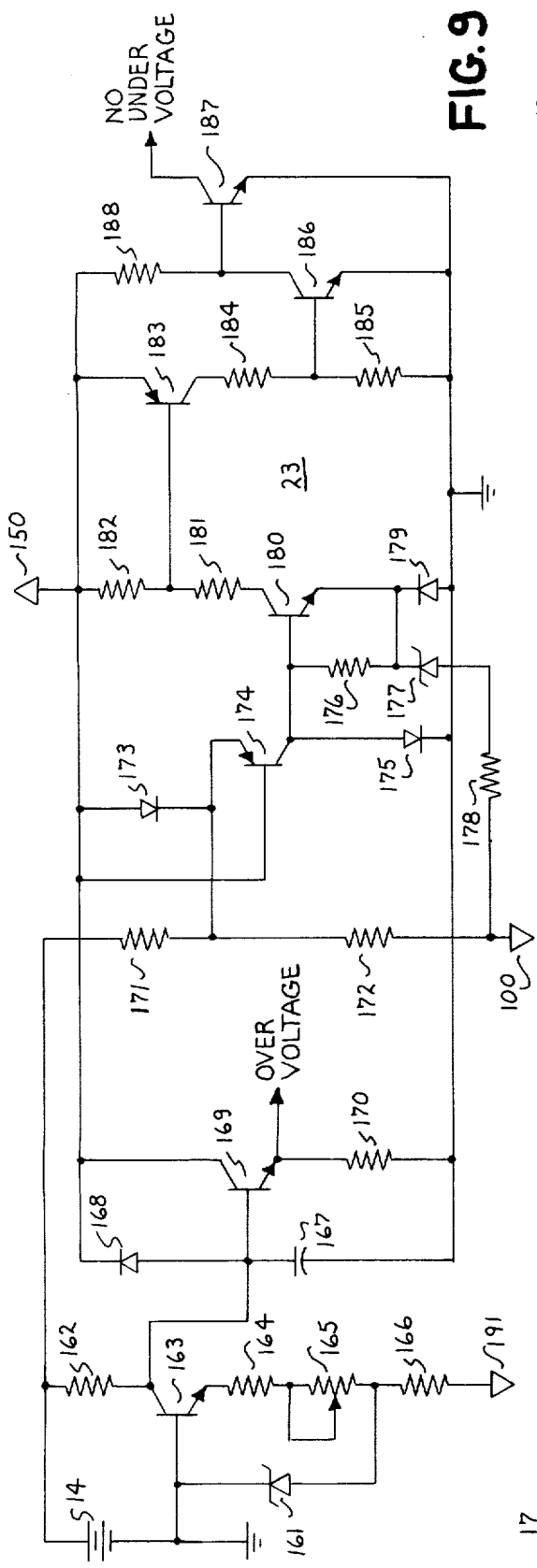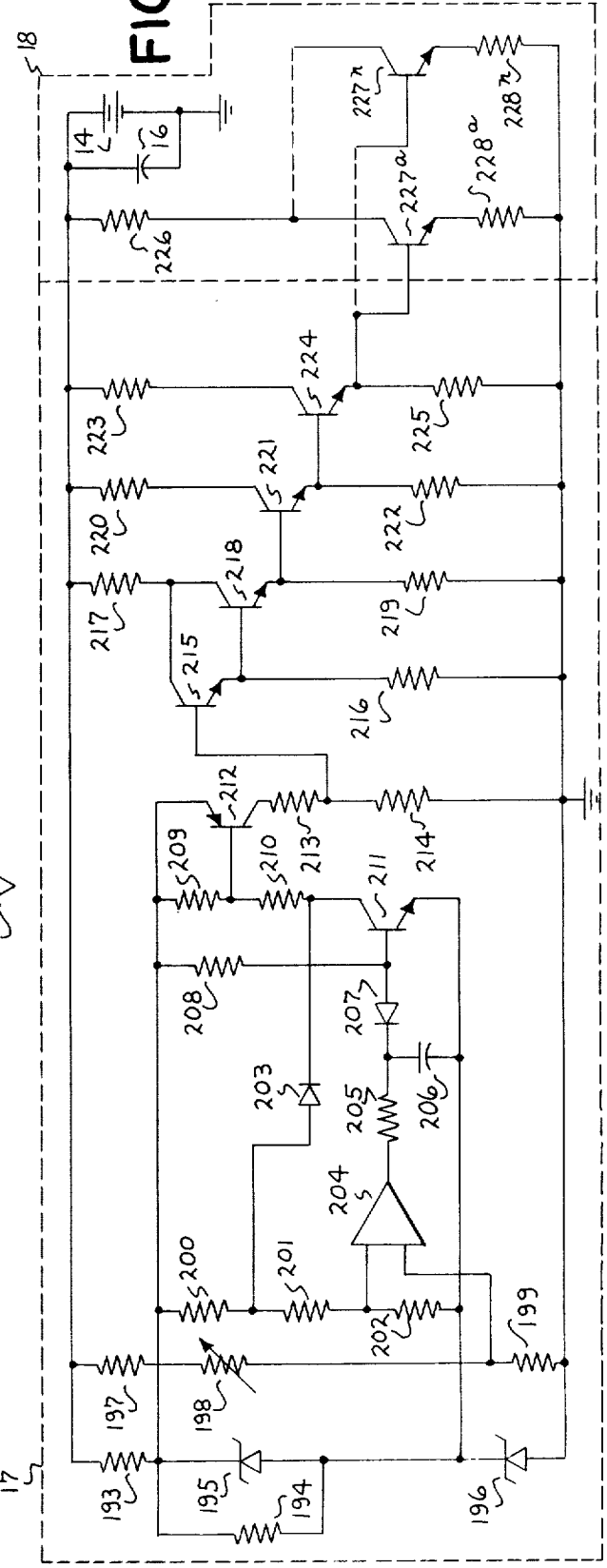
FIG.9
FIG.10

3,883,786

PULSE WIDTH MODULATED SERVO SYSTEM

RELATED APPLICATIONS

This application is related to application Ser. No. 389,557, entitled "Circuit for Generating a Voltage Proportional to Motor Armature Current" by Irvin L. Erler, filed Aug. 20, 1973 and application Ser. No. 393,980, entitled "Pulse Width Modulated Servo with Armature Voltage Feedback" by Irvin L. Erler, filed Sept. 4, 1973 and assigned to the same assignee as this application.

BACKGROUND OF THE INVENTION

This relates to an improved pulse width modulation servo system and, more particularly, to improved circuits for monitoring and controlling the performance of a pulse width modulated bridge switching amplifier that drives the motor. More specifically, in the motor control circuit of this invention various parameters such as motor armature current, power supply voltages and switch current levels are monitored and compared to predetermined limits. Upon detecting that one of the monitored parameters has exceeded its predetermined limit, the motor control circuit either takes remedial action that will help restore the excessive parameter to an acceptable level, or prevent further energization of the motor.

The motor control system of this invention utilizes a bridge switching amplifier similar to one described in U.S. Pat. 3,525,019, issued to John Joslyn et al., and assigned to the General Electric Company. In a bridge switching amplifier, four switches are connected to form a bridge. The motor is connected across one diagonal of the bridge and a d-c voltage source is connected across the other diagonal of the bridge. If one pair of diagonally opposed switches is made conductive while the other pair of diagonally opposed switches is made non-conductive, the d-c voltage source will drive current through the motor in one direction. If the other pair of diagonally opposed switches is made conductive while the one pair of diagonally opposed switches is made non-conductive, current will be driven through the motor in the opposite direction. A pulse width command signal, usually derived from an error signal, controls the conducting interval of the pairs of diagonally opposed switches thereby providing drive to the motor in proportion of the command signal.

In order to prevent damage to the motor, it has been found desirable to limit the motor armature current to a predetermined maximum value. In one type of motor control system in which the control circuitry commands the level of motor armature current, current limit is effected by limiting the maximum commanded armature current level. In the motor control system of this invention, the motor control circuitry commands the level of motor armature voltage. The motor control circuit monitors the armature current level and when the armature current exceeds the predetermined maximum value, the control circuit modifies the command armature voltage level so as to cause a reduction of the armature current level.

Under certain conditions, such as during the deceleration of a high inertial load, the d-c motor will act as a generator and return energy to the d-c voltage source. Since the d-c voltage source is not capable of returning this energy to the power system, this energy is stored on the filter capacitors at the output of the d-c voltage source, thereby causing an increase in the terminal voltage of the d-c voltage source. In the past, when small motors were driven from a pulse width modulated bridge circuit, the magnitude of this increased voltage buildup was not harmful. However, when large motors from 1 to 10 horsepower are driven, the voltage buildup on the filter capacitors could damage the bridge switching elements or the d-c voltage source. In the pulse width modulated servo system of this invention, the terminal voltage of the voltage source is monitored and if the terminal voltage exceeds a predetermined limit a resistive load is switched in circuit with the voltage source which dissipates the excessive energy stored on the filter capacitors of the d-c voltage source.

When driving a d-c motor from a pulse width modulated bridge switching amplifier, it has been found desirable to monitor the current conductor through each leg of the bridge to determine whether the switch in each leg is operating properly. Due to the large current being supplied to the motor each switch usually consists of a plurality of transistor switches connected in parallel. In one prior motor control circuit the average current being supplied to the motor from each leg of the bridge is monitored and a fault is indicated when the average current in any one leg exceeds a predetermined limit. One problem with monitoring the average current in each leg is that it is difficult to establish the proper predetermined limit. In other words, for a certain predetermined limit the current level of one transistor switch is one leg of the bridge might be excessive, while the average current in that leg remains less than the limit. In the pulse width modulated motor servo system of this invention the current of each transistor switch in each bridge leg is monitored and the d-c voltage source is disconnected from the motor when the current in any one transistor switch exceeds a predetermined limit.

If the terminal voltage of the d-c voltage source that energizes the motor is too high, the motor control circuitry or the motor could be damaged and if the terminal voltage is too low, the motor control circuitry will not operate efficiently. In the pulse width modulated servo system of this invention the terminal voltage of the d-c voltage source that energizes the motor is monitored and if the terminal voltage is too high, the d-c source is removed from the motor and the motor is allowed to come to rest; if the terminal voltage is too low, the d-c voltage source is removed from the motor until the terminal voltage of the d-c voltage source returns to an acceptable level.

The motor control system uses low voltage power supplies to operate the analog and digital control circuits and to provide bias voltages for the power transistors that make up the bridge switches. If the bias voltage for the power transistor switches is too low, the power transistor will dissipate an excessive amount of power. In the pulse width modulated motor servo of this invention the low voltage power supply is monitored and if the terminal voltage fails below a predetermined limit the d-c voltage source is disconnected from the motor until the terminal voltage of the low voltage power supply returns to an acceptable value.

As described above, when certain errors are detected in the motor control circuitry the d-c voltage source is disconnected from the motor and the motor is allowed to come to rest. The analog control portion of the motor control circuit usually includes a stability network which includes an energy storage element such as a capacitor. If this capacitor is not fully discharged when the motor is restarted it will cause an initial armature voltage command signal to be present which will cause the motor to initially move. In certain applications such as when the motor is controlling a machine tool this initial motion could cause the machine tool to damage the workpiece. The pulse width modulated servo of this invention includes a circuit that senses that the motor is being stopped and discharges the capacitor in the stability network.

It is therefore a primary object of the present invention to provide a new and improved motor drive circuit that uses a bridge switching amplifier.

Another object of this invention is to provide a more reliable motor drive circuit that uses a bridge type power switching amplifier.

Another object of the invention is to provide a improved circuit for limiting the armature current that can flow in a d-c motor that is driven from a bridge switching amplifier.

Another object of the invention is to provide a load to dissipate excessive energy being returned to the motor control system when the mechanical energy of the motor is converted into electrical energy.

And yet another object of the invention is to prevent the motor control circuit from operating when the power supply voltage levels or transistor switch current levels are out of limits.

It is a further object of this invention to prevent a large drive signal from being applied to the motor when the motor is first started or restarted.

SUMMARY OF THE INVENTION

The motor control circuit of this invention includes a bridge switching amplifier consisting of four power switches connected to form a bridge. The d-c motor is connected across one diagonal of the bridge and a d-c voltage source is connected across another diagonal of the bridge. If one pair of diagonally opposed switches is made conductive while the other pair of diagonally opposed switches is made non-conductive, the d-c voltage source will drive current through the load in one direction. If the other pair of diagonally opposed switches is made conductive while the one pair of diagonally opposed switches is made non-conductive current will be driven through the load in the opposite direction. The analog portion of the motor control circuit generates a pulse width command signal that controls the conducting intervals of the switches so as to drive the motor in proportion to a commanded velocity signal. The analog control portion of the motor control circuit includes a first summing amplifier that generates an armature voltage command signal that is a function of the difference between the command velocity signal and the actual velocity of the motor. A second summing amplifier generates the pulse width command signal which is a function of the difference between the armature voltage command signal and a signal representative of the actual armature voltage of the motor.

The motor control system includes an armature current monitoring circuit. As long as the armature current is less than a predetermined maximum value the motor will be driven in proportion to the velocity error. However, when the motor armature current exceeds the predetermined limit, the current limit signal takes over and acts to reduce the motor armature current.

In another aspect of the motor control system of this invention the terminal voltage of the d-c voltage source that energizes that motor is monitored and if the terminal voltage exceeds a predetermined limit a resistive load is switched across the d-c voltage source to dissipate the energy which is being returned to the motor control system by the motor.

Each of the four power switches consists of a plurality of power transistor switches in parallel. A resistor is placed in series with each transistor switch in order to develop a voltage that is proportional to the current flowing through the transistor switch. The voltage across each series resistor is monitored and if any of the monitored voltages exceeds a predetermined limit the d-c voltage source is disconnected from the motor and the motor is allowed to come to a stop.

The d-c voltage such that energizes the motor is monitored and if the terminal voltage exceeds a predetermined maximum value the d-c voltage source is disconnected from the motor and the motor is allowed to come to a stop. If the terminal voltage of the d-c voltage source falls below a predetermined minimum value, the d-c voltage source is temporarily disconnected from the motor until the terminal voltage of the d-c voltage source is restored to a value above the predetermined minimum value.

When the motor is commanded to come to a stop, means are provided for discharging any energy storage elements in the stability network in the analog control circuit that would have the motor start other than zero speed command.

DESCRIPTION OF THE DRAWINGS

While the specification concludes with claims particularly pointing out and distinctly claiming that which is regarded as the present invention, the objects and advantages of this invention can be more readily ascertained from the following description of a preferred embodiment when read in conjunction with the accompanying drawings in which:

FIGS. 3a to 3f are series of timing diagrams that illustrate how the power switches respond to the pulse width command signal.

FIG. 5 is a schematic diagram of the armature current monitoring circuit shown as a block in FIG. 1.

FIG. 6 is a schematic diagram of the triangular wave generator shown as a block in FIG. 1.

FIG. 7 is a schematic diagram of the switch, shown as a block in FIG. 3, that discharges the capacitor in the stability network of the analog control portion of the motor control system.

FIG. 8 is a schematic diagram partially in block form of a typical delaying element shown as a block in FIG. 3.

FIG. 9 is a schematic diagram of the voltage monitoring circuit shown as a block in FIG. 1.

FIG. 10 is a schematic diagram of the circuit, shown as a block in FIG. 1, that switches in a load to dissipate energy when the motor is returning energy to the motor control system.

FIG. 11 is a schematic diagram of an error sensing circuit, shown as a block in FIG. 2.

DETAILED DESCRIPTION

For the sake of convenience, elements that are referenced in one Figure will retain the same element reference number in succeeding Figures.

Figure 1:
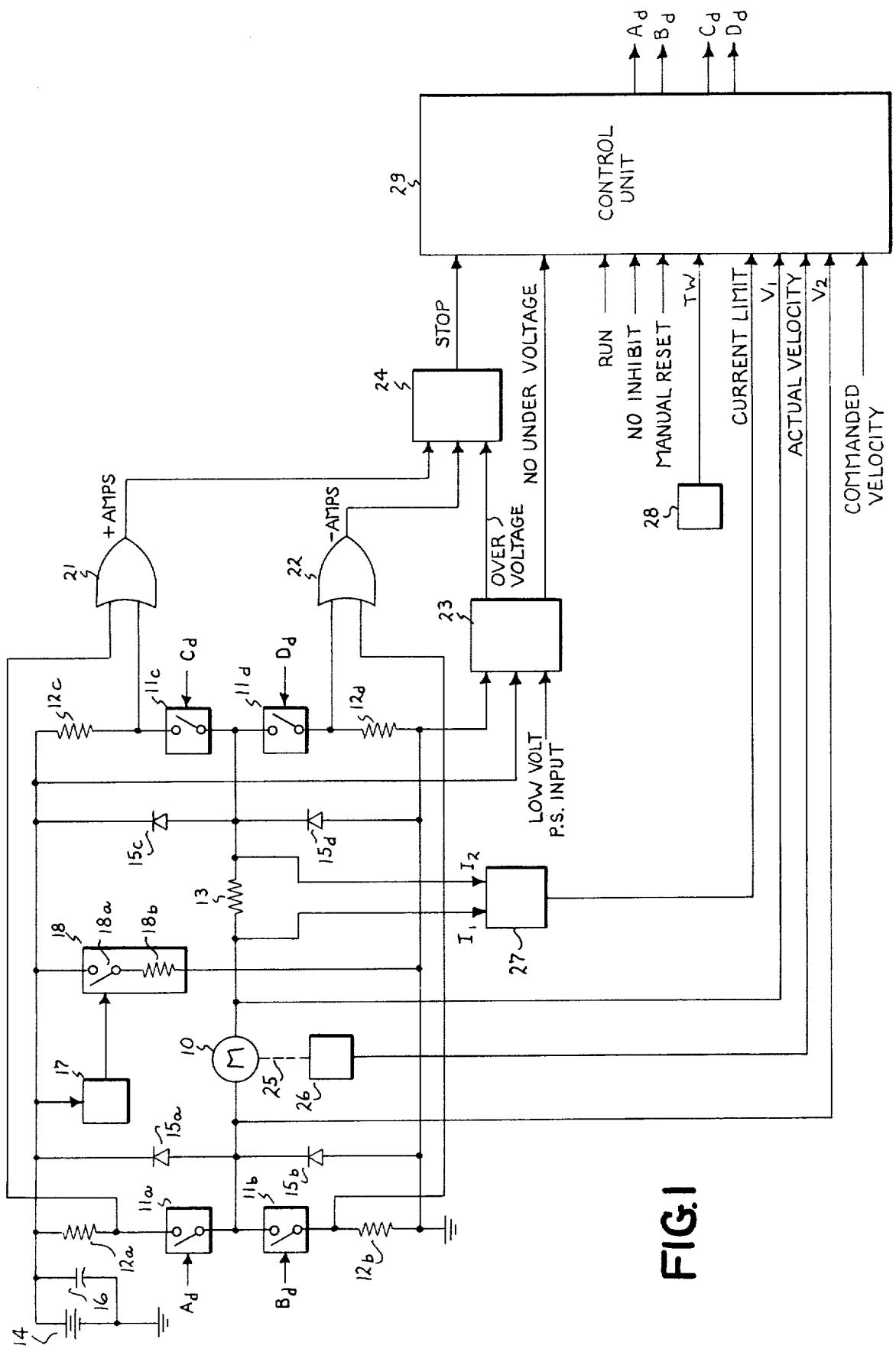
FIG. 1 is a functional block diagram of a motor control system using a pulse width modulated bridge switching amplifier in accordance with the invention.

As shown in FIG. 1 the four legs of a bridge are each comprised of a switch 11 in series with a resistor 12. The series combination of a motor 10 and a resistor 13 is connected across one diagonal of the bridge and a d-c voltage source 14, which in a predetermined embodiment is 90 volts, is connected across the other diagonal of the bridge. Diodes 15a, 15b, 15c and 15d are connected in parallel with each leg of the bridge and are poled to provide an alternate conductive path whereby the motor armature current can flow into the positive terminal of the 90 volt source 14. Capacitor 16 in parallel with the 90 volt source 14 filters the terminal voltage of source 14.

Monitor circuit 17 monitors the terminal voltage of the 90 volt source 14 and closes switch 18a thereby connecting resistor 18b across the 90 volt source 14 whenever the terminal voltage of the 90 volt source 14 exceeds a predetermined maximum value. Analog OR circuit 21 monitors the voltage developed across all resistors 12a, 12c in the two legs of the bridge that are connected to the positive terminal of the 90 volt source 14. The output of analog OR circuit 21 is a voltage, referenced to the positive terminal of the 90 volt source 14, that corresponds to the voltage of that resistor 12a, 12c having the greatest voltage developed thereacross. Similarly, analog OR circuit 22 monitors the voltage developed across all of the resistors 12b, 12d in the two legs of the bridge connected to the negative terminal of the 90 volt source 14. Power supply monitor 23 monitors the voltage level of the 90 volt source 14 and of any low voltage power supplies, not shown, which are used by the motor control system. The power supply monitor 23 provides an OVER VOLTAGE signal to an error detection circuit 24 and provides a NO UNDER VOLTAGE signal to the control unit 29. The error detection circuit 24 monitors the +AMPS signal from analog OR circuit 21, the −AMPS signal from analog OR circuit 22 and the OVER VOLTAGE signal from power supply monitor 23. If the +AMPS signal or the −AMPS signal exceeds a predetermined level or if the OVER VOLTAGE signal is present the error detection circuit 24 generates a STOP signal for the control unit 29.

The motor 10 drives a tachometer 26 as indicated by dashed line 25. The tachometer 26 output, designated ACTUAL VELOCITY, is a voltage that is proportional to the actual velocity of the motor 10. An armature current measuring circuit 27 is connected across resistor 13 and generates a CURRENT LIMIT signal for control unit 29. A triangle wave generator 28 generates a triangular shaped reference signal, TW, that is used by control unit 29. The armature voltage of motor 10 is applied to the inputs, designated $V_1$ and $V_2$, of control unit 29. The primary control input is the COMMANDED VELOCITY signal which in one application of this motor control system is proportional to the difference between the commanded and actual position of an object being positioned by motor 10. Also shown as inputs to the control unit are the three signals RUN, NO INHIBIT and MANUAL RESET, as being typical of operator initiated inputs to a motor control system.

The control unit 29 generates the signals $A_d$, $B_d$, $C_d$, $D_d$ which operate switches 11a through 11d, respectively, so as to control the motor 10 in accordance with the various control inputs of described below.

Figure 2:
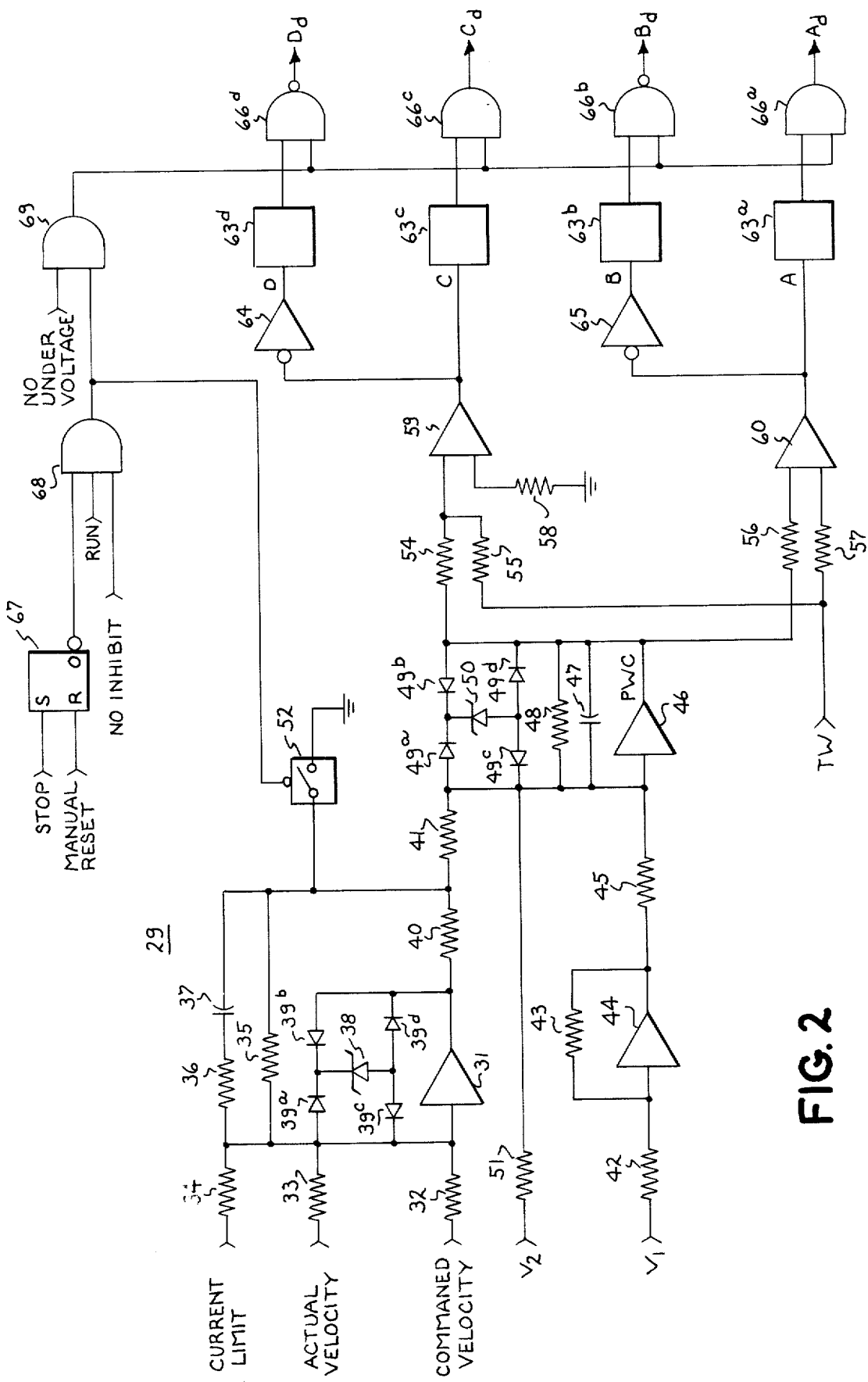
FIG. 2 is a block and logic diagram of the control unit shown as a block in FIG. 1.

FIG. 2 is a detailed diagram of the control unit 29, shown as a block in FIG. 1. The COMMANDED VELOCITY, ACTUAL VELOCITY, and CURRENT LIMIT signals are applied to analog amplifier 31 through resistors 32, 33 and 34, respectively. Resistor 35 establishes the gain of amplifier 31 and resistor 36 and capacitor 37 act as a stability network for controlling the high frequency gain of amplifier 31. The network consisting of diode 39a through 39d and zener diode 38 limits the voltage amplitude of the output of amplifier 31 to the breakdown voltage of zener diode 38. Resistor 40 protects amplifier 31 when switch 52 is closed. The output of amplifier 31, at the junction of resistors 40 and 41, is a velocity error signal but can also be looked upon as a armature voltage command signal being applied to analog amplifier 46 through input resistor 41. The voltage at one terminal of motor 10 is applied to amplifier 46 through input resistor 51 while the voltage at the other terminal of the motor 10 is multiplied by minus 1 by resistor 42 and 43 and amplifier 44 before being applied to amplifier 46 through input resistor 45. The transfer function of amplifier 46 is determined by resistor 48 and capacitor 47. The network consisting of diode 49a through 49d and zener diode 50 limits the voltage amplitude of amplifier 46 to the breakdown voltage of zener diode 50. The output, PWC, of amplifier 46 is a voltage that is proportional to the difference between the actual armature voltage of motor 10 and the commanded armature voltage signal generated by amplifier 31. The PWC signal is applied to one input of comparator 59 through input resistor 54 and to one input of comparator 60 through input resistor 56. The TW signal is applied to the one input of comparator 59 through input resistor 55 and to the other input of comparator 60 through input resistor 57. The other input of comparator 59 is connected to ground through resistor 58. The output, C, of comparator 59 is applied to delay circuit 63c and is inverted by inverter 64 to generate the signal D which is applied to delay circuit 63d. Similarly, the output, A, of comparator 60 is applied to delaying circuit 63a and is inverted by inverter 65 to generate the signal B which is applied to delay circuit 63b. The output of delay circuits 63a through 63d, respectively, drive one input of AND gates 66a through 66d. The STOP signal controls the set input of a latch 67 while the MANUAL RESET signal controls the reset input of latch 67. The zero output of latch 67 drives one input of AND gate 68 and the RUN and NO INHIBIT signals control and the other inputs of AND gate 68. The output of AND gate 68 is applied to one input of AND gate 69 and the NO UNDER VOLTAGE signal controls the other input of AND gate 69. The output of AND gate 69 is applied to the other input of AND gates 66a through 66d. The output of AND gate 68 also controls the closing of switch 52 which discharges capacitor 37 thereby resetting the stability network in amplifier 31.

The operation of the circuit will now be described. When switches 11a and 11d are closed and switches 11c and 11b are open, the 90 volt source 14 will drive current through the switch 11a and then through the motor from left to right and then through closed switch 11d. When it is desired to drive the motor 10 in the opposite direction, switches 11b and 11c will be closed and switches 11a and 11d will be open and the 90 volt source 14 drives current through closed switch 11c through the motor from right to left and through closed 11b. Power switches 11a through 11d are operated by AND gates 66a through 66d, respectively. The operation of switches 11a through 11d are controlled by the polarity and magnitude of the PWC signal generated by amplifier 46. Comparators 59 and 60 convert the PWC analog voltage into a pulse time duration signal as described below in the description of FIG. 3. In a prior pulse width modulated servo system the PWC signal is determined solely from a velocity error signal such as that generated by amplifier 31. For the reasons now described, it has been found beneficial to have the PWC signal determined from the difference between the velocity error signal generated by amplifier 31 and the motor armature voltage. The switches 11a through 11d each consist of a plurality of power transistors in parallel in order to handle the current levels required to drive the motor 10. As is well known in the art, transistors have a faster turn-on time than a turn-off time. As a result when the output of comparator 59 is trying to turn on switch 11c while at the very same time the inverter 64 is trying to turn off switch 11d, there is the danger that switch 11c will be turned on before switch 11d is turned off, thereby causing substantially a short circuit across the 90 volt source 14. This short circuit can cause damage to either the 90 volt source 14 or to the transistors that make up switches 11c and 11d. This short circuit condition is prevented by delay circuits 63a through 63d which delay the closing but not the opening of switches 11a through 11d. The polarity of the PWC signal determines whether switches 11a and 11d should be closed or whether switches 11b and 11c should be closed. If switches 11a and 11d are to be closed, then the signals $A_d$ and $B_d$ of AND gates 66a and 66d will overlap and the amount of the overlap, in the ideal case, should be directly proportional to the magnitude of the PWC signal. However, because of the delay circuits 66a through 66d, the PWC signal must reach a certain level before the $A_d$ and $B_d$ signals overlap. If, as in prior control circuits, the PWC signal level is determined solely from the velocity error signal, the motor would not be responsive to a range of low velocity error signals. In other words, if the command velocity signal changed thereby causing a velocity error signal to be generated by amplifier 31, the velocity error signal would have to exceed a certain value before AND gates 66a through 66d would generate pulses that would act to correct the motor velocity. This lack of response is known in the art as deadband. This deadband is significantly reduced by combining the velocity error signal output of amplifier 31 with a signal representative of the motor armature voltage. A more detailed discussion of this problem is provided in the aforementioned related application Ser. No. 393,980.

FIG. 3 is a series of waveforms showing how comparators 59 and 60 generate switch control signals A, B, C and D from the PEC signal. As shown in FIG. 3a, the PWC signal is positive which means that switches 11a and 11d are to be closed so that the positive terminal of the 90 volt source 14 is connected to the left end of the motor 10 and the negative terminal is connected to the right end of the motor 10. The length of time during each cycle that the 90 volt source 14 is to be connected across the motor 10 is determined by the magnitude of the PWC signal. Also shown in FIG. 3a is the TW output of the triangular wave generator 28 having a frequency of 1 kilohertz. As shown in FIG. 3a, comparator 60 compares the TW signal to the PWC signal to generate the signal A which is illustrated in FIG. 3b. As shown in FIG. 3a, comparator 59 compares ground, or zero volts, to the summation of the TW signal and the PWC signal, the dashed waveform, to generate the signal C shown in FIG. 3c. The signal B shown in FIG. 3d is the logical inversion of the signal A and the signal D shown in FIG. 3e is the logical inversion of the signal C. The logical 1 level of the waveform of FIG. 3f indicates that the 90 volt source 14 is to be connected across the motor 10 when both signals A and D are at the logic 1 level. When the d-c voltage source 14 is not connected across the motor 10, as indicated by the logic zero level of the waveform of FIG. 3f, the motor armature current is allowed to circulate alternately between a first path consisting of closed switches 11a and 11c and a second path consisting of closed switches 11b and 11d. It can be seen from FIG. 3 that as the magnitude of PWC decreases the length of time that the 90 volt source 14 is connected to the motor 10 will be decreased and that as the magnitude of the PWC signal is increased the length of time that the 90 volt source 14 is connected to the motor 10 will be increased. The response of amplifier 31 to the current limit signal will now be explained. When the motor armature current is below a predetermined maximum value the output of the armature current measuring circuit 27 introduces a zero voltage level into resistor 34. The output of amplifier 31 will then be proportional to the difference between the ACTUAL VELOCITY signal and the COMMANDED VELOCITY signal, or, is in proportion to the velocity error. When the motor armature current exceeds the predetermined maximum value, the output of the armature current measuring circuit 27 introduces a signal into amplifier 31 through resistor 35 that subtracts from the difference between the ACTUAL VELOCITY and the COMMAND VELOCITY signal, thereby causing the motor to be energized in such a manner that the motor armature current is reduced. When the measuring circuit 27 determines that the motor armature current has fallen below the predetermined maximum value the output of the measuring circuit 27 again provides a zero voltage input to amplifier 31 and control of the motor is again determined by the difference between the ACTUAL VELOCITY and COMMANDED VELOCITY signals. The response of the control unit 29 to the different control and error signals will now be described. When the error detection circuit 24 senses that the current level through any of the resistors 12a through 12d in series with the power transistors in switches 11a through 11d is excessive or that the power supply monitor 23 has detected an over voltage condition the STOP output goes to a logic level which sets latch 67. When latch 67 is set the zero output will go to a logic level 0 thereby causing AND gates 66a through 66d, 68 and 69 to have logic level 0 outputs. Since the outputs of AND gates 66a through 66d all have a logic level 0, output switches 11a and 11d will all be opened thereby permanently disconnecting the 90 volt source 14 from the motor 10. When the output of AND gate 68 is at the logic 0 level, switch 52 will be closed which discharges capacitor 37 so that it will have zero voltage stored across it when the operator restarts the motor. Latch 67 prevents the motor from being energized unless the latch is reset by the operator causing the MANUAL RESET signal to go to a logic 5 level that resets latch 67. When latch 67 is reset, the zero output goes to the logic 1 level and if the NO INHIBIT signal and the Run signal are also at a logic 1 level the output of AND gate 68 will be a logic 1 level which opens switch 52. When the NO UNDER VOLTAGE signal is at the logic 1 level and the output of AND 68 is at a logic 1 level and the output of AND gate 69 will be a logic 1 level which enables AND gate 66a through 66d to operate switches 11a through 11d in accordance with the control signals from delay circuits 63a through 63d. When the power supply monitor 23 determines that no power supply is in an under voltage condition the NO UNDER VOLTAGE signal will be a logic 1 level. When one of the power supplies is in an under voltage condition, the NO UNDER VOLTAGE signal will go to the logic 0 level which causes AND gate 69 to have a logic 0 level output thereby preventing 90 volt source 14 from energizing the motor 10. It is to be noted that the NO UNDER VOLTAGE signal does not affect latch 67 and, therefore, operator intervention is not required in order for control to be returned to the signals generated by delay circuits 63a through 63d. As soon as power supply monitor 23 determines that none of the power supplies is under voltage the NO UNDER VOLTAGE signal will be returned to the logic 1 state and AND gates 66a through 66d will be enabled allowing the analog control circuits to resume control of the motor 10.

Figure 4:
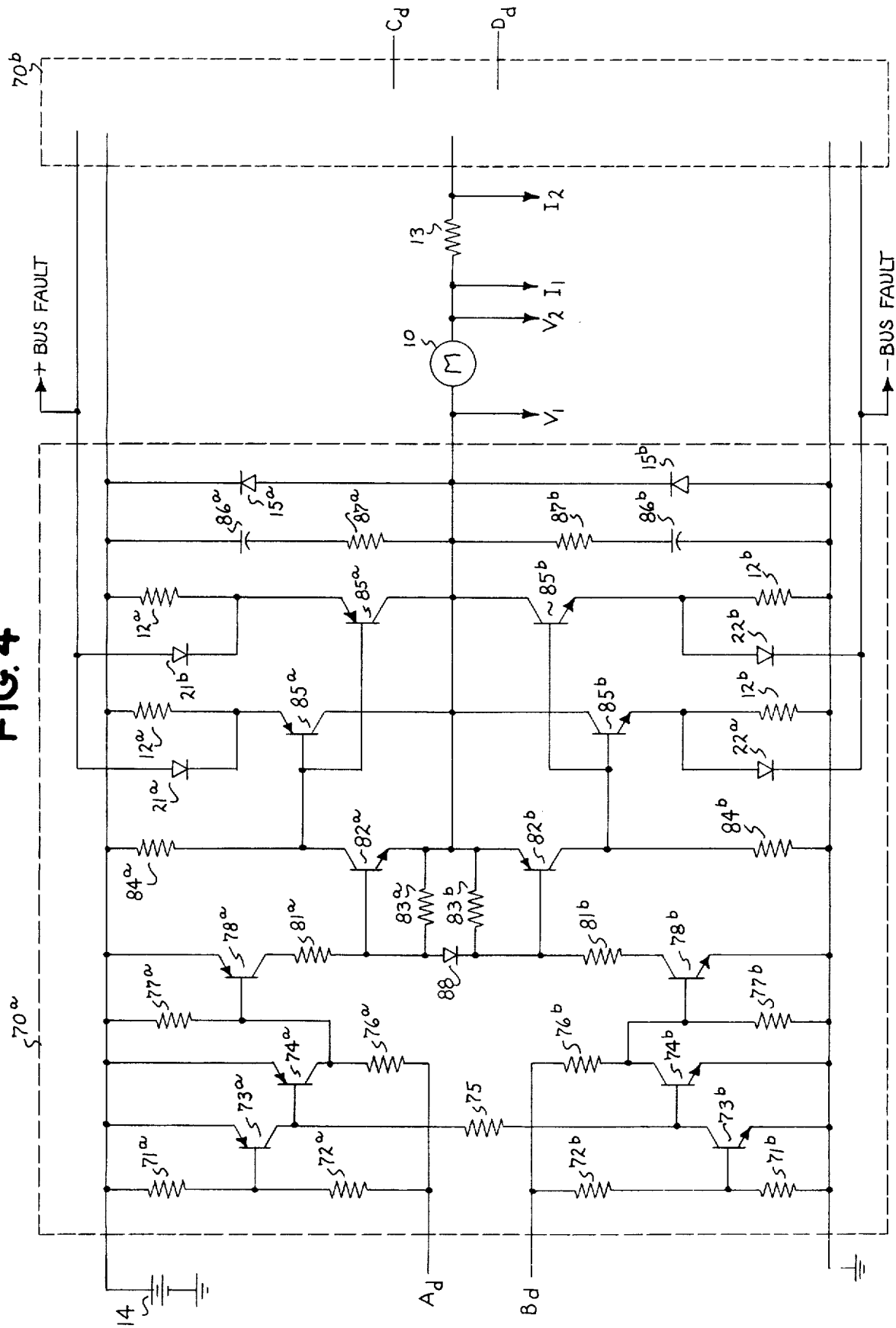
FIG. 4 is a schematic diagram of a bridge switching amplifier.

FIG. 4 is a schematic diagram of the bridge switching network. In FIG. 4, only the circuitry connected to the left hand terminal, enclosed within the dotted line 70a, of the motor 10 is shown in detail as the identical circuitry, as designated by the dotted line 70b, is connected to the right hand terminal of the sensing resistor 13. The signal $A_d$ controls the connection of the positive terminal of the 90 volt source 14 to the left hand terminal of the motor 10 through a plurality of series resistors 12a and through the emitter-collector circuits of a plurality of power transistors 85a. When the signal $a_d$ is at low voltage level, resistors 71a and 72a bias the base of transistor 73a so that transistor 73a conducts. When transistor 73a conducts, the base of transistor 74a will be very nearly equal to 90 volts thereby causing transistor 74a to be non-conductive. When transistor 74a is non-conductive, resistors 76a and 77a bias the base of transistor 78a so that transistor 78a conducts. When transistor 78a conducts, resistors 81a and 83a bias the base of transistor 82a so that transistor 82a conducts. When transistor 82a conducts, current flows in the emitter-base circuits of power transistors 85a, making transistors 85a conductive, so that the positive terminal of the 90 volt source 14 is connected to the left hand terminal of the motor through resistors 12a and the emitter-collector circuits of transistors 85a. When the $A_d$ signal is at the high voltage level; that is, +90 volts, the base of transistor 73a is biased so that transistor 73a is non-conductive. When transistor 73a is non-conductive, transistor 74a will conduct by virtue of the current flowing from the 90 volt source 14 through resistor 75 and through the base-emitter junction of transistor 74b. When transistor 74a conducts, the base of transistor 78a will be maintained near 90 volts and transistor 78a is non-conductive. When transistor 78a is non-conductive, current can not flow in the base-emitter circuit of transistor 82a and transistor 82a is non-conductive. When transistor 82a is non-conductive, the bases of power transistors 85a are maintained at 90 volts through resistor 84a thereby making transistors 85a non-conductive, and in effect disconnecting the 90 volt source 14 from the left hand terminal of the motor 10.

The current supplied to the left hand terminal of motor 10 flows through a sensing resistor 12a associated with each power transistor 85a. The voltage developed across each resistor 12a is proportional to the current flowing through its associated power transistor 85a. Diodes 21a, 21b act as an analog OR circuit and the + BUS FAULT signal at the anode of diodes 21a, 21b will be a function of the largest voltage developed across resistors 12a.

Resistor 87 and capacitor 86 is a snubbing circuit that limits the amplitude of the transistor signals that occur when the reverse recovery current of diode 15 dies out.

Since it will be recognized by one skilled in the art that the circuitry that response to the $B_d$ signal is the complement of the circuitry that responds to the $A_d$ signal that circuitry will not be described in detail. It will be pointed out that when the $B_d$ signal is a high voltage level, ground will be connected to the left hand terminal of the motor 10 through resistors 12b and the emitter-collector circuits of transistors 85b, and when the $B_d$ signal is a relatively low voltage, such as ground, transistors 85b will be made non-conductive disconnecting ground from the left hand terminal of the motor 10.

Diode 88 blocks a sneak path tending to turn on transistor 82b under certain conditions. When transistor 78b is non-conductive, transistor 82b should also be non-conductive. But if diode 88 is replaced by a short circuit and the voltage at the left hand terminal of the motor 10 should exceed 90 volts, current can flow through the path consisting of emitter-base junction of transistor 82b, the short circuit across diode 88, resistor 81a, the collector-base junction of transistor 78a, resistor 77a, and the 90 volt source 14. This current flow tends to turn on transistor 82b even though transistor 78b is non-conductive. Diode 88 blocks this sneak path.

FIG. 5 is a schematic diagram of the armature current measuring circuit 27 shown as a block in FIG. 1. For a more detailed measuring circuit, refer to the above-mentioned application Ser. No. 389,557. The motor armature current flowing through resistor 13 generates a voltage across resistor 13 that is proportional to the motor armature current. The measuring circuit monitors the voltage developed across resistor 13 and generates a CURRENT LIMIT signal that looks like an open circuit when the motor armature current is less than a predetermined maximum value and looks like a voltage that is a function of the motor armature current when the motor armature current exceeds the predetermined maximum value. The measuring circuit 27 is complicated by the fact that the reference for the voltage developed across resistor 13 can be either ground or 90 volts.

The voltage developed across resistor 13 is applied to input terminals $I_1$ and $I_2$. A voltage divider consisting of resistors 94 and 95 provides, at the center tap, a voltage that is related to the reference, either ground or 90 volts, for the voltage developed across resistor 13. Resistors 102 and 103 form a voltage divider between ground and the minus low voltage power supply 100 to establish a constant voltage at the base of transistor 97. Since the voltage drop across the base emitter junction of transistor 97 is also a constant, a fixed voltage appears across emitter resistor 98 thereby establishing a constant current flow through transistor 97 and resistor 96. This constant current flow through resistor 96 establishes a constant voltage drop across resistor 96 which biases the bases of transistors 92 and 105 so that transistors 92 and 105 conduct over the full current range. Capacitor 101 merely filters any high frequency noise that appears at the voltage divider tap.

Since the voltage at the bases of transistor 92 and transistor 105 is equal, and since the base-to-emitter voltage drop of transistor 92 is, for all practical purposes, equal to the base-to-emitter voltage drop of transistor 105, the voltage at the emitter of transistor 92 is equal to the voltage at the emitter of transistor 105. The magnitude of the current flowing through resistor 91 will be determined by the difference between the voltage at $I_2$ and the voltage at the emitter of transistor 92. This current flows through collector resistor 93 to develop a voltage at the collector of transistor 92 that is referenced to the minus low voltage power supply 100 and which is proportional to the difference between the voltage at $I_2$ and the voltage at the emitter of transistor 92. In a similar manner, the current that flows through resistor 104 will be determined by the difference between the voltage at $I_1$ and the voltage at the emitter of transistor 105. This current flows through collector resistor 108 to develop a voltage at the collector of transistor 105 that is also referenced to the minus low voltage power supply 100 and which is proportional to the difference between the voltage at $I_1$ and the voltage at the emitter of transistor 105. The voltage at the collector transistor 92 is applied to one input of difference amplifier 115 through input resistor 111 and the voltage at the collector of transistor 105 is applied to the other input of difference amplifier 115 through resistor 112. Resistors 113 and 114 determine the gain of difference amplifier 115. Since difference amplifier 40 responds to the difference between the voltage at the collector of transistor 92 and the voltage at the collector of transistor 105, and since the voltage at the emitter of transistor 92 equals the voltage at the emitter of transistor 105, the output of difference amplifier 115 will only be a function of the difference between the voltage at $I_2$ and the voltage at $I_1$. As mentioned above, this difference is proportional to the motor armature current. Amplifier 118 merely multiplies the voltage out of difference amplifier 115 by a minus constant factor as determined by resistors 116 and 117. The output of amplifier 118 is applied to the network consisting of diodes 120a through 120d, resistors 119 and 122, diodes 123a and 123b, and zener diode 121. As long as the voltage level out of amplifier diode 121. As long as the voltage level out of amplifier 118 is less than the breakdown voltage of zener diode 121, zener diode 121 will be back biased and no current will be supplied to the CURRENT LIMIT output. When the voltage amplitude of amplifier 118 exceeds the breakdown voltage of zener diode 121, zener diode 121 conducts and current will be supplied to the CURRENT LIMIT output in a first proportion to the difference between the voltage of amplifier 118 and the breakdown of zener diode 121 as determined by resistor 119. If the voltage output of amplifier 118 continues to increase, diodes 123a and 123b will ultimately become conductive so that the amount of current supplied to the CURRENT LIMIT is in a second proportion to the difference between the voltage of amplifier 118 and the breakdown voltage of zener diode 121 is determined primarily by resistor 122.

Diodes 109 and 110 clamp the collectors of transistors 92 and 105 to ground in order to prevent a large positive voltage from being applied to either input of difference amplifier 115. Potentiometer 106 is connected between the collector of transistor 92 and the collector of transistor 105. The arm of the potentiometer 106 is connected to minus low voltage power supply 100 through resistor 107. Potentiometer 106 is used to adjust for zero output of amplifier 115 when there is zero armature current.

FIG. 6 is a schematic diagram of the triangle wave generator 28 shown as a block in FIG. 1. Comparator 126 generates a 1 kilohertz square wave. The network consisting of diodes 130a through 130d and zener diode 131 precisely limits the positive and negative amplitude of the square wave and difference amplifier 135 integrates and precise square wave to generate the triangular wave signal, TW.

Difference amplifier 126 drives a voltage divider network consisting of resistors 128 and 129 and an integrating network consisting of resistor 125 and capacitor 124. When the voltage at the tap of the voltage divider is applied to one input of comparator 126 and the integrated voltage appearing across the integrating capacitor 124 is applied to the other input of comparator 126, the comparator 126 will oscillate at a frequency as determined by the values of capacitor 124 and resistors 125, 128 and 129. Zener diode 131 and diodes 130a through 130d precisely limits the positive and negative amplitude of the square wave signal to a value as determined by the breakdown voltage of zener diode 121. Resistor 127 limits the current that flows through zener diode 131. The square wave signal is applied to one input of difference amplifier 135 through input resistor 132. The reference, ground, is applied to the other input of difference amplifier 135 through resistor 138. Resistor 136 and capacitor 138 lets difference amplifier 135 integrate the square wave input signal to provide the very precise triangular shaped signal, TW, at the output. Diodes 133 and 134 clamp the input of difference amplifier 135 to ground thereby preventing the application of a large signal at the input of difference amplifier 135.

FIG. 7 is a schematic diagram of the switch 52 designated as a block in FIG. 2. Referring now to FIG. 2, the input of switch 52 is controlled by AND gate 68. When the output of AND gate 68 is at the high voltage level, the switch 52 should be opened and should have no effect on the signal appearing at the junction of resistors 40 and 41. When the output of AND gate 68 is at the low voltage level, the switch 52 should be closed so as to apply ground to the junction of resistors 40 and 41 which discharges capacitor 37 in the feedback path of amplifier 31. Referring now to FIG. 7, when the signal at the input 152 of switch 52 is at the high voltage level, resistors 140 and 141 bias transistor 146 so that it is non-conductive and resistor 142, 143 and 147 bias transistor 145 so that it also is non-conductive. Since the voltage appearing at the output 153 of switch 52 is limited by the network consisting of diodes 39a through 39d and zener diode 38 to amplitude that is less than either the positive low voltage power supply 150 or the negative low voltage power supply 100, both diodes 148 and 149 will be backed biased and the switch will have no effect on the signal appearing at the output 153. When the signal at the input 152 goes to the low voltage level, resistors 140 and 141 bias transistor 146 so that it conducts thereby providing a low impedance path to ground at the anode of diode 149. Resistors 142 and 143 now bias transistor 145 so that it conducts thereby also providing a low impedance path to ground at the cathode of diode 148. If the voltage stored on capacitor 37 and appearing at output terminal 153 is positive, diode 148 becomes forward biased thereby providing a low impedance path to ground which discharges capacitor 37; and, similarly, if the voltage stored on capacitor 37 is negative, diode 149 provides a low impedance path to ground which discharges capacitor 47.

FIG. 8 is a schematic diagram of a typical delaying element 63a through 63d shown as a block in FIG. 2.

The delay circuit 63 delays the rising transistion of the signal A but not the falling transistor of signal A. When the signal A is at the low voltage level, diode 154 conducts so that the voltage $V_c$ on capacitor 156 is approximately equal to the low voltage level of the signal A. When $V_c$ is at the low voltage level, the $A_d$ output of amplifier 158 enables AND gate 66. When the signal A goes from the low voltage level to the high voltage level, diode 154 is initially back biased and the voltage $V_c$ of capacitor 156 will build up exponentially towards the voltage of the positive low voltage power supply 150. When the voltage $V_c$ reaches a predetermined threshold level, the output $A_d$ of amplifier 158 changes thereby disabling AND gate 66. when the signal A goes from the high voltage level to the low voltage level, diode 154 immediately becomes forward biased, and since both the diode 154 and the amplifier 60 that drives the input A of delaying circuit 63 presents a low impedance path for the discharge of capacitor 156, the voltage $V_c$ returns to the low voltage level substantially without delay thereby causing amplifier 158 to disable AND gate 66 substantially without delay.

FIG. 9 is a schematic diagram of the power supply monitor 23 shown as a block in FIG. 1. The power supply monitor 23 monitors the 90 volt source 14 for the bridge and the low voltage power supply 100. If the voltage at the positive terminal of the 90 volt source 14 exceeds a predetermined maximum value, the OVER VOLTAGE output indicates an error to error detection circuit 24. If the voltage at the positive terminal of the 90 volt source 14 falls below a predetermined minimum value, the NO UNDER VOLTAGE output of the power supply monitor 23 causes the control unit 29 to temporarily prevent further energization of the motor 10. The power supply monitor 23 also monitors the minus low voltage power supply 100 that supplies power to the circuits that control the bridge. If the magnitude of the minus low voltage power supply 100 falls below a predetermined value, the NO UNDER VOLTAGE output will also cause the control unit to temporarily prevent further energization of the motor 10. Referring now to FIG. 9, the 90 volt source 14 causes current to flow through resistor 162, transistor 163, resistor 164, variable resistor 165 and resistor 166. Zener diode 161 establishes a constant current flow through resistor 164 and variable resistor 165. When the voltage at the positive terminal of the 90 volt source 14 is less than a predetermined value, which is a preferred embodiment is 130 volts, the voltage drop across resistor 162 biases transistor 169 so that it is non-conductive. When the voltage at the positive terminal of the 90 volt source 14 increases above 130 volts, the base of transistor 169 is biased above ground and transistor 169 conducts thereby activating the OVER VOLTAGE output being sensed by error detection circuit 24. Capacitor 167 provides some integration of the signal applied to the base of transistor 169 and diode 168, which clamps the base of transistor 169 to the positive low voltage power supply 150, prevents the application of any excessive voltage to the base of transistor 169. Variable resistor 165 allows some adjustment of the voltage level of the 90 volt source 14 that will cause the OVER VOLTAGE output to indicate an error.

The impedance looking into the NO UNDER VOLTAGE output terminal of power supply monitor 23 will look like an open circuit when both the 90 volt source 14 and the negative low voltage power supply 100 are in their prescribed ranges. If the 90 volt source 14 falls below 50 volts or if the magnitude of the minus low voltage power supply 100, which in a preferred embodiment is 15 volts, should fall to approximately 13 volts, the impedance looking into the NO UNDER VOLTAGE output terminal of the power supply monitor 23 will appear to be a very low impedance to ground. When the voltage at the positive terminal of the 90 volt source 14 is in a proper range, the voltage at the center tap of voltage divider resistors 171 and 172 bias the emitter of transistor 174 so that it is more positive then the positive low voltage power supply 150 connected to the base of transistor 174, and transistor 174 is conductive. When transistor 174 conducts, current is made available for the base of transistor 180. Whether transistor 180 conducts depends not only upon transistor 174 being conductive but also on the network consisting of resistor 176, zener diode 177 and resistor 178 connected to the minus low voltage supply 100. Zener diode 177 is a 13 volt zener diode and as long as the voltage of the minus low voltage power supply 100 is in the range of 13 to 15 volts the potential at the cathode of zener diode 177, which is connected to the emitter of transistor 180, will be below ground and any base current made available by transistor 174 is allowed to flow thereby making transistor 180 conductive. When transistor 180 conducts, resistors 181 and 182 bias transistor 183 so that transistor 183 conducts. When transistor 183 conducts, resistors 184 and 185 bias transistor 186 so that transistor 186 conducts. When transistor 186 conducts, the base of transistor 187 is maintained at ground and transistor 187 is non-conductive so that the impedance looking into the NO UNDER VOLTAGE terminal looks like an open circuit.

If the voltage at the positive terminal of the 90 volt source 14 falls below 50 volts the potential at the junction of voltage divider resistors 171 and 172 falls below the voltage of the low voltage power supply 189 so that transistor 174 becomes non-conductive. When transistor 174 is non-conductive, there is no base current available for transistor 180 and transistor 180 becomes non-conductive. When transistor 180 is non-conductive, transitor 183 is biased so that it is non-conductive. When transistor 183 is non-conductive there is no base current available for transistor 186 and transistor 186 becomes non-conductive. When transistor 186 is non-conductive, transistor 187 becomes conductive and the impedance looking into the NO UNDER VOLTAGE terminal will appear to be a small resistance to ground.

If the 90 volt source 14 is operating within its prescribed limit so that transistor 174 is trying to make base current available for transistor 180, and the magnitude of the minus 15 volt power supply 100 falls below 13 volts, the potential at the cathode of zener diode 177 will be above ground so that both zener diode 177 and diode 179 are back biased thereby preventing current from flowing in the base-emitter circuit of transistor 180 which makes transistor 180 non-conductive. As mentioned above, when transistor 180 conducts, transistor 187 conducts indicating power supply undervoltage condition.

FIG. 10 is a schematic diagram of the monitor circuit 17, switch 18a and resistive load 18b shown as blocks in FIG. 1. The monitor 17 detects when the amplitude of the 90 volt source 14 exceeds 120 volts as would happen when the motor 10 acts as a generator and returns energy to the 90 volt source 14. Zener diodes 195 and 196 are driven from the 90 volt source 14 through resistors 193 and 194 and provide two reference voltages for the monitor 17. The voltage at the cathode of zener diode 196 is a low reference voltage for the monitor 17 and the voltage at the cathode of zener diode 195 is a high reference voltage for the monitor 17. A voltage divider network consisting of resistors 200, 201 and 202 provides at the junction of resistors 201 and 202 a precise voltage with respect to ground at one input of difference amplifier 204. The voltage divider network consisting of resistor 197, variable resistor 198 and resistor 199 provides at the junction of resistor 199 and variable resistor 198 a voltage at the input of difference amplifier 204 that is a function of the terminal voltage of the 90 volt source 14. The variable resistor 198 allows for adjustment of the voltage level of the 90 volt source 14 at which the monitor 17 closes switch 18a. As long as the voltage of the 90 volt source 14 is less than 120 volts, the output of difference amplifier 204 will be relatively low voltage level and the voltage stored on capacitor 206 causes transistor 211 to be back biased and non-conductive. When transistor 211 is non-conductive, resistors 209 and 210 bias transistor 212 so that transistor 212 is non-conductive. When transistor 212 is non-conductive, resistors 213 and 214 bias transistor 215 so that it is non-conductive. When transistor 215 is non-conductive, transistors 218, 221 and 224 will be prevented from becoming conductive. When transistor 244 is non-conductive, base current cannot be supplied to power transistors 227a through 227n and the resistive loads 228a through 228n are not connected in circuit with the 90 volt source 14. When the voltage at the positive terminal at the 90 volt source 14 goes above 120 volts, the voltage at the junction of resistor 199 and variable resistor 198 exceeds the reference voltage at the junction of resistors 201 and 202 causing the output difference amplifier 204 to increase the voltage applied to capacitor 206. Resistor 205 and capacitor 206 act as an integrating network which means that the 90 volt source 14 must exceed the predetermined level for some period of time before the resistive load 18b is switched into the circuit. When the voltage on capacitor 206 builds up to the point where it exceeds the voltage applied to the emitter of transistor 211, transistor 211 becomes conductive. When transistor 211 is conductive, resistors 209 and 210 bias transistor 212 so that transistor 212 conducts. When transistor 212 conducts, resistors 213 and 214 bias transistor 215 so that transistor 215 conducts. When transistor 215 conducts, base current is supplied to transistor 218 which becomes conductive and supplies base current to transistor 221. When transistor 221 conducts, it supplies base current to transistor 224 allowing transistor 224 to become conductive. When transistor 224 conducts it will supply base current to power transistors 227a through 227n thereby connecting resistive loads 228a through 228n in circuit with the 90 volt source 14. This additional load will tend to dissipate any energy regenerated by the motor which is being stored on filter capacitor 16 in parallel with the 90 volt source 14. The diode 203 prevents high frequency oscillation of the monitor 17 and switched load 18 by causing the reference voltage applied to the one input of difference amplifier 204 to be lowered once the monitor 17 has sensed that the terminal voltage of the 90 volt source 14 has exceeded 120 volts. Thus, if the monitor switches in the resistive load 18b when the voltage of the 90 volt source 14 exceeds 120 volts, the resistive load 18b will not be disconnected from the 90 volt source 14 unless the terminal voltage of the 90 volt source 14 falls below 115 volts. When the transistor 211 is non-conductive, the voltage at the cathode of diode 203 will be essentially the same as that appearing at the cathode of zener diode 195 so that diode 203 is back biased and has no effect on the voltage divider network consisting of resistors 200, 201, and 202. However, when transistor 211 becomes conductive, the voltage at the cathode of diode 203 is lowered causing diode 203 to become forward biased which clamps the junction of resistors 200 and 201 to a lower voltage, thereby lowering the reference voltage at the junction of resistors 201 and 202 that is being applied to the one input of difference amplifier 204.

FIG. 11 is a schematic diagram of the error detection circuit 24 shown as a block in FIG. 1. When the + AMPS, – AMPS and OVER VOLTAGE inputs are in the no error condition, the STOP output will be a high voltage level which enables the motor 10 to be energized from the 90 volt source 14. When either the + AMPS, – AMPS or OVER VOLTAGE input indicates an error, the STOP output will go to ground which sets latch 67 of FIG. 2 which prevents the motor from being energized. In the circuit of FIG. 11 the voltage at the junction of resistors 233 and 239 determines whether transistor 246 is conductive or non-conductive. When no error is present, the voltage at the junction of resistors 233 and 239 is such that the divider network formed by resistors 239 and 241 biases transistor 246 so that transistor 246 is non-conductive. When transistor 246 is non-conductive, the STOP output at the collector of transistor 246 will equal the voltage of the positive low voltage power supply 150. Transistor 246 is made conductive by increasing the voltage at the junction of resistor 233 and 239. The voltage at the junction of resistors 233 and 239 can be increased either by increasing the voltage appearing at the – AMPS terminal or at the OVER VOLTAGE terminal, or by making transistor 242 conductive. Transistor 242 will conduct when the voltage at the + AMPS input falls below a predetermined value, when the voltage at the + AMPS input is above the predetermined value, the voltage divider network consisting of resistors 231, 238 and 240 biases transistor 242 so that transistor 242 is non-conductive. When the voltage at the + AMPS input falls below the predetermined value, the voltage divider network consisting of resistors 231, 238 and 240 biases transistor 242 into conduction which increases the voltage at the junction of resistors 233 and 239. When transistor 242 conducts, the STOP output will be connected to ground through the collector-emitter circuit of transistor 246.

While the present invention has been described with reference to a specific embodiment thereof, it will be obvious to those skilled in the art that various changes and modifications may be made without departing from the invention in its broadest aspects.

It is contemplated in the appended claims to cover all variations and modifications of the invention which come within the true spirit and scope of the invention.

What is claimed as new and desired to be secure by Letters Patent in the United States is:

1. a circuit for driving a d-c motor from a d-c voltage source in response to a commanded velocity signal comprising:
   a. four switch elements connected to form a bridge, the motor being connected across one diagonal of the bridge and the d-c voltage source being connected across the other diagonal of the bridge so that when one pair of diagonally opposed switches is closed the voltage source will drive current through the motor in one direction and when the other pair of diagonally opposed switches is closed the voltage source will drive current through the motor in the other direction;
   b. four diodes, each diode being connected in parallel with one of the switch elements and poled to conduct current into the positive terminal of the voltage source;
   c. means for generating a signal proportional to the actual velocity of the motor;
   d. current sensing means responsive to the motor armature current for generating a current limit signal having a first signal level when the motor armature current is less than a selected value and having a good signal level when the motor armature current is greater then the selected value;
   e. a summing amplifier responsive to the commanded velocity signal and to the actual velocity signal for generating a velocity error signal that is proportional to the difference between the commanded velocity signal and the actual velocity signal;
   f. a circuit means responsive to the current sensing means second level for causing the summing amplifier velocity error signal to be modified so that the motor armature current is limited;
   g. switch control means responsive to the velocity error for operating the switch elements, the polarity of the velocity error signal determining which switch elements are to be closed and the magnitude of the velocity error signal determining the duration said switch elements are closed, said motor drive circuit operating to make the actual velocity of the motor equal the commanded velocity.

2. A motor drive circuit as recited in claim 1 additionally comprising:
   a. circuit means connected to the d-c voltage source for generating a signal having a first level when the voltage of the d-c voltage source increases beyond a first predetermined value and having a second level when the voltage of the d-c voltage source decreases below a second predetermined value;
   b. energy dissipative means; and
   c. a switch responsive to the first level of the circuit means signal for connecting the energy dissipative means across the d-c voltage source and responsive to the second level of the circuit means signal for disconnecting the energy dissipative means from the d-c voltage source.

3. A motor drive circuit as recited in claim 1 wherein each power switch comprises a plurality of transistors, said motor drive circuit additionally includes a bus fault detection circuit comprising:
   a. a resistor in series with each power switch transistor and the d-c voltage source; and
   b. circuit means responsive to the voltage developed across each series resistor for opening all of the power switches when one of the developed voltages exceeds a predetermined level.

4. A motor drive circuit as recited in claim 3 wherein the bus fault detection circuit includes a latch circuit for remembering that one of the developed voltages has exceeded a predetermined level and wherein the power switches are maintained open until the motor comes to a stop, said motor drive circuit additionally comprising:
   a. a stability network; and
   b. circuit means, responsive to the latch output for resetting the stability network so that the motor starts with zero commanded velocity.

5. A motor drive circuit as recited in claim 1 additionally comprising:
   a. a monitor circuit responsive to the d-c voltage source for generating an error signal when the d-c voltage source either exceeds a predetermined maximum value or is less than a predetermined minimum value; and
   b. circuit means responsive to the error signal for opening all of the power switches.

6. A circuit for driving a d-c motor from a d-c voltage source in response to a command velocity signal comprising:
   a. four switch elements connected to form a bridge the motor being connected across one diagonal of the bridge and the d-c voltage source being connected across the other diagonal of the bridge so that when one pair of diagonally opposed switches is closed the voltage source will drive current through the motor in one direction and when the other pair of diagonally opposed switches is closed the voltage source will drive current through the motor in the other direction;
   b. four diodes, each diode being connected in parallel with one of the switch elements and poled to conduct current into the positive terminal of the voltage source;
   c. means for generating a signal proportional to the actual velocity of the motor;
   d. current sensing means responsive to the motor armature current for generating a current limit signal having a first signal level when the motor armature current is less than a selected value and having a second signal level when the motor armature current is greater than the selected value;

e. a summing amplifier circuit responsive to the commanded velocity signal, the actual velocity signal and the current limit signal for generating a velocity error signal that is proportional to the difference between the commanded velocity signal and the actual velocity signal when the motor armature current is less than the selected value and to the difference between the commanded velocity and the sum of the actual velocity signal and the current limit signal when the motor armature current is greater than the selected value; and f. switch control means responsive to the velocity error signal for operating the switch elements, the polarity of the velocity error signal determining which switch elements are to be closed and the magnitude of the velocity error signal determining the duration said switch elements are closed, said motor drive circuit operating to make the actual velocity of the motor equal the commanded velocity.

7. A motor drive circuit as recited in claim 6 additionally comprising:
   a. circuit means connected to the d-c voltage source for generating a signal having a first level when the voltage of the d-c voltage source increases beyond a first predetermined value and having a second level when the voltage of the d-c voltage source decreases below a second predetermined value;
   b. energy dissipative means; and
   c. a switch responsive to the first level of the circuit means signal for connecting the energy dissipative means across the d-c voltage source and responsive to the second level of the circuit means signal for disconnecting the energy dissipative means from the d-c voltage source.

8. A motor drive circuit as recited in claim 6 wherein each power switch comprises a plurality of transistors, said motor drive circuit additionally includes a bus fault detection circuit comprising:
   a. a resistor in series with each power switch transistor and the d-c voltage source; and
   b. circuit means responsive to the voltage developed across each series resistor for opening all of the power switches when one of the developed voltages exceeds a predetermined level.

9. A motor drive circuit as recited in claim 8 wherein the bus fault detection circuit includes a latch circuit for remembering that one of the developed voltages has exceeded a predetermined level and wherein the power switches are maintained open until the motor comes to a stop, said motor drive circuit additionally comprising:
   a. a stability network; and
   b. circuit means, responsive to the latch output for resetting the stability network so that the motor starts with zero commanded velocity.

10. A motor drive circuit as recited in claim 1 additionally comprising:
    a. a monitor circuit responsive to the d-c voltage source for generating an error signal when the d-c voltage source either exceeds a predetermined maximum value or is less than a predetermined minimum value; and
    b. circuit means responsive to the error signal for opening all of the power switches.

11. A circuit for driving a d-c motor from a d-c voltage source in response to a commanded velocity signal comprising:

a. four switch elements connected to form a bridge, the motor being connected across one diagonal of the bridge and the d-c voltage source being connected across the other diagonal of the bridge so that when one pair of diagonally opposed switches is closed the voltage source will drive current through the motor in one direction and when the other pair of diagonally opposed switches is closed the voltage source will drive current through the motor in the other direction;

b. four diodes, each diode being connected in parallel with one of the switch elements and poled to conduct current into the positive terminal of the voltage source;

c. means for generating a signal proportional to the actual velocity of the motor;

d. current sensing means responsive to the motor armature current for generating a current limit signal having a first signal level when the motor armature current is less than a selected value and having a second signal level when the motor armature current is greater than the selected value;

e. first summing amplifier responsive to the commanded velocity signal and to the actual velocity signal for generating a velocity error signal that is proportional to the difference between the commanded velocity signal and the actual velocity signal;

f. a second summing amplifier responsive to the error signal and to the motor armature voltage for generating a voltage command signal proportional to the difference between the error signal and the motor armature voltage;

g. a circuit means responsive to the current sensing means second level for causing the voltage command signal to be modified so that the motor armature current is limited; and h. switch control means responsive to the voltage command signal for operating the switch elements, the polarity of the voltage command signal determining which switch elements are to be closed and the magnitude of the voltage command signal determining the duration said switch elements are closed, said motor drive circuit operating to make the actual velocity of the motor equal the commanded velocity.

12. A motor drive circuit as recited in claim 11 additionally comprising:
    a. circuit means connected to the d-c voltage source for generating a signal having a first level when the voltage of the d-c voltage source increases beyond a first predetermined value and having a second level when the voltage of the d-c voltage source decreases below a second predetermined value;
    b. energy dissipative means; and
    c. a switch responsive to the first level of the circuit means signal for connecting the energy dissipative means across the d-c voltage source and responsive to the second level of the circuit means signal for disconnecting the energy dissipative means from the d-c voltage source.

13. A motor drive circuit as recited in claim 11 wherein each power switch comprises a plurality of transistors, said motor drive circuit additionally includes a bus fault detection circuit comprising:
    a. a resistor in series with each power switch transistor and the d-c voltage source; and b. circuit means responsive to the voltage developed across each series resistor for opening all of the power switches when one of the developed voltages exceeds a predetermined level.

14. A motor drive circuit as recited in claim 13 wherein the bus fault detection circuit includes a latch circuit for remembering that one of the developed voltages has exceeded a predetermined level and wherein the power switches are maintained open until the motor comes to a stop, said motor drive circuit additionally comprising:
   a. a stability network; and
   b. circuit means, responsive to the latch output for resetting the stability network so that the motor starts with zero commanded velocity.

15. A motor drive circuit as recited in claim 11 additionally comprising:
   a. a monitor circuit responsive to the d-c voltage source for generating an error signal when the d-c voltage source either exceeds a predetermined maximum value or is less than a predetermined minimum value; and
   b. circuit means responsive to the error signal for opening all of the power switches.

16. A circuit for driving a d-c motor from a d-c voltage source in response to a commanded velocity signal comprising:
   a. four switch elements connected to form a bridge, the motor being connected across one diagonal of the bridge and the d-c voltage source being connected across the other diagonal of the bridge so that when one pair of diagonally opposed switches is closed the voltage source will drive current through the motor in one direction and when the other pair of diagonally opposed switches is closed the voltage source will drive current through the motor in the other direction;
   b. four diodes, each diode being connected in parallel with one of the switch elements and poled to conduct current into the positive terminal of the voltage source;
   c. means for generating a signal proportional to the actual velocity of the motor;
   d. current sensing means responsive to the motor armature current for generating a current limit signal having a first signal level when the motor armature current is less than a selected value and having a second signal level when the motor armature current is greater than the selected value;
   e. first summing amplifier responsive to the commanded velocity signal, the actual velocity signal and the current limit signal for generating a velocity error signal that is proportional to the difference between the commanded velocity signal and the actual velocity signal when the current limit signal is at the first level and to the difference between the commanded velocity and the sum of the actual velocity signal and the current limit signal when the current limit signal is at the second level;
   f. a second summing amplifier responsive to the error signal and to the motor armature voltage for generating a voltage command signal proportional to the difference between the error signal and the motor armature voltage; and
   g. switch control means responsive to the voltage command signal for operating the switch elements, the polarity of the voltage command signal determining which switch elements are to be closed and the magnitude of the voltage command signal determining the duration said switch elements are closed, said motor drive circuit operating to make the actual velocity of the motor equal the commanded velocity.

17. A motor drive circuit as recited in claim 16 additionally comprising:
   a. circuit means connected to the d-c voltage source for generating a signal having a first level when the voltage of the d-c voltage source increases beyond a first predetermined value and having a second level when the voltage of the d-c voltage source decreases below a second predetermined value;
   b. energy dissipative means; and
   c. a switch responsive to the first level of the circuit means signal for connecting the energy dissipative means across the d-c voltage source and responsive to the second level of the circuit means signal for disconnecting the energy dissipative means from the d-c voltage source.

18. A motor drive circuit as recited in claim 16 wherein each power switch comprises a plurality of transistors, said motor drive circuit additionally includes a bus fault detection circuit comprising:
   a. a resistor in series with each power switch transistor and the d-c voltage source; and
   b. circuit means responsive to the voltage developed across each series resistor for opening all of the power switches when one of the developed voltages exceeds a predetermined level.

19. A motor drive circuit as recited in claim 18 wherein the bus fault detection circuit includes a latch circuit for remembering that one of the developed voltages has exceeded a predetermined level and wherein the power switches are maintained open until the motor comes to a stop, said motor drive circuit additionally comprising:
   a. a stability network; and
   b. circuit means, responsive to the latch output for resetting the stability network so that the motor starts with zero commanded velocity.

20. A motor drive circuit as recited in claim 1 wherein the current limit signal generated by the current sensing means has a first signal level when the motor armature current is less than a first selected value, has a second signal level when the motor armature current is greater than the first selected value, and has a third signal level when the motor armature current is greater than a second selected value, said second selected value being greater than said first selected value.

* * * * *